United States Patent
Li et al.

(10) Patent No.: US 9,933,952 B1
(45) Date of Patent: Apr. 3, 2018

(54) BALANCING ALLOCATED CACHE PAGES AMONG STORAGE DEVICES IN A FLASH CACHE

(71) Applicant: EMC Corporation, Hopkinton, MA (US)

(72) Inventors: Liam Xiongcheng Li, Beiijing (CN); Xinlei Xu, Beijing (CN); Lifeng Yang, Beijing (CN); Jian Gao, Beijing (CN); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 15/086,527

(22) Filed: Mar. 31, 2016

(51) Int. Cl.
  *G06F 12/00* (2006.01)
  *G06F 13/00* (2006.01)
  (Continued)

(52) U.S. Cl.
  CPC .......... *G06F 3/0611* (2013.01); *G06F 3/0655* (2013.01); *G06F 3/0679* (2013.01)

(58) Field of Classification Search
  CPC ........ G06F 3/06; G06F 3/0601; G06F 3/0602; G06F 3/061; G06F 3/0611; G06F 3/0613; G06F 3/0628–3/0653; G06F 3/0655–3/0667; G06F 3/0668–3/0679; G06F 3/068–3/0689; G06F 9/455–9/45558; G06F 12/00; G06F 12/02; G06F 12/023; G06F 12/0238; G06F 12/0246; G06F 12/06; G06F 12/0638; G06F 12/08–12/128; G06F 13/00; G06F 2003/0691; G06F 2003/0692; G06F 2003/0694; G06F 2003/0695; G06F 2003/0697; G06F 2003/0698; G06F 2009/45562–2009/45595; G06F 2206/00–2206/20;
  (Continued)

(56) References Cited

U.S. PATENT DOCUMENTS 8,046,551 B1 * 10/2011 Sahin ................ G06F 11/2074 711/162
9,569,120 B2 * 2/2017 Ryan .................... G11C 16/349
(Continued)

OTHER PUBLICATIONS

Integrating NAND Flash Devices onto Servers; Roberts et al; Communications of the ACM, vol. 52, No. 4; Apr. 2009; retrieved from http://faculty.cs.tamu.edu/ajiang/Server.pdf on Jun. 19, 2017; pp. 98-106 (9 pages).*
(Continued)

*Primary Examiner* — Daniel C Chappell
(74) *Attorney, Agent, or Firm* — Krishnendu Gupta; Brian Hamilton; Lesley A. Leonessa

(57) ABSTRACT

Described herein are techniques for use in balancing allocated cache pages among storage devices in a flash cache. The techniques comprise determining an expected number of allocated cache pages in connection with a non-volatile storage device that forms at least part of a flash cache. The techniques also comprise performing a comparison between the expected number of allocated cache pages and an actual number of allocated or free cache pages in connection with the non-volatile storage device. The techniques further comprise selecting, based on the comparison, a free cache page in connection with the non-volatile storage device to allocate as a cache page.

17 Claims, 6 Drawing Sheets

(51) Int. Cl.
*G06F 13/28* (2006.01)
*G06F 3/06* (2006.01)

(58) Field of Classification Search
CPC .................. G06F 2211/00–2211/902; G06F 2212/00–2212/7211
See application file for complete search history.

(56) References Cited

U.S. PATENT DOCUMENTS

| | | | | |
|---|---|---|---|---|
| 9,639,283 B2* | 5/2017 | Ryan | .................. | G06F 3/0616 |
| 9,639,284 B2* | 5/2017 | Ryan | .................. | G06F 3/0653 |
| 9,645,751 B2* | 5/2017 | Ryan | .................. | G06F 3/0616 |
| 9,734,050 B2* | 8/2017 | Sinclair | ............... | G06F 12/0246 |
| 2004/0024941 A1* | 2/2004 | Olarig | ................. | G06F 13/4081 |
| | | | | 710/302 |
| 2010/0250700 A1* | 9/2010 | O'Brien | ................ | G06F 3/0611 |
| | | | | 709/217 |
| 2013/0138884 A1* | 5/2013 | Kawamura | ......... | G06F 12/0866 |
| | | | | 711/119 |
| 2013/0275672 A1* | 10/2013 | Bert | .................... | G06F 12/0246 |
| | | | | 711/114 |
| 2014/0229658 A1* | 8/2014 | Maharana | ........... | G06F 12/0866 |
| | | | | 711/103 |
| 2015/0193154 A1* | 7/2015 | Gong | .................... | G06F 3/0616 |
| | | | | 711/103 |
| 2016/0055084 A1* | 2/2016 | Rangaswami | ............ | G06F 3/06 |
| | | | | 711/141 |
| 2016/0253091 A1* | 9/2016 | Ayyavu | ................... | G06F 3/061 |
| | | | | 711/103 |

OTHER PUBLICATIONS

Demand-based block-level address mapping in large-scale NAND flash storage systems; Qin et al; Proceedings of the eighth IEEE/ACM/IFIP international conference on Hardware/software codesign and system synthesisl Oct. 24, 2010-Oct. 29, 2010; pp. 173-182 (10 pages) (Year: 2010).*

WARM: Improving NAND flash memory lifetime with write-hotness aware retention management; Luo et al; 31st Symposium on Mass Storage Systems and Technologies; May 30, 2015-Jun. 5, 2015 (14 pages) (Year: 2015).*

Amnesic cache management for non-volatile memory; Kang et al; 31st Symposium on Mass Storage Systems and Technologies; May 30, 2015-Jun. 5, 2015 (13 pages) (Year: 2015).*

* cited by examiner

BALANCING ALLOCATED CACHE PAGES AMONG STORAGE DEVICES IN A FLASH CACHE

TECHNICAL FIELD

The present invention relates generally to data storage. More specifically, the present invention relates to a method, an apparatus and a computer program product for use in balancing allocated cache pages among storage devices in a flash cache.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, caching may be used whereby data of the cache may be used to service operations rather than data as may be stored on a slower storage medium, such as disk. When a requester requests data, there may be considerable latency incurred in the process of retrieving the data from the disk. A cache may store data in a memory characterized as a relatively fast memory that is separate from the disks in order to address some of the latency issues associated with disks. The cache memory may contain some or a portion of the data as stored on the disk. Upon receiving a request, for example, to read data, the data storage system may service the request using the cached data if such requested data is currently in the cache.

The use of solid-state storage devices is increasing in popularity as solid-state memory has advanced to the point where cost and density of memory is such that organizations can afford to operate with systems that store and process terabytes of data. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF THE INVENTION

There is disclosed a computer-implemented method, comprising: determining an expected number of allocated cache pages in connection with a non-volatile storage device that forms at least part of a flash cache; performing a comparison between the expected number of allocated cache pages and an actual number of allocated or free cache pages in connection with the non-volatile storage device; and based on the comparison, selecting a free cache page in connection with the non-volatile storage device to allocate as a cache page.

There is also disclosed an apparatus, comprising: memory; and processing circuitry coupled to the memory, the memory storing program code which, when executed by the processing circuitry, cause the processing circuitry to: determine an expected number of allocated cache pages in connection with a non-volatile storage device that forms at least part of a flash cache; perform a comparison between the expected number of allocated cache pages and an actual number of allocated or free cache pages in connection with the non-volatile storage device; and based on the comparison, select a free cache page in connection with the non-volatile storage device to allocate as a cache page.

There is further disclosed a computer program product having a non-transitory computer readable medium which stores a set of instructions, the set of instructions, when carried out by processing circuitry, causing the processing circuitry to perform a method, the method comprising: determining an expected number of allocated cache pages in connection with a non-volatile storage device that forms at least part of a flash cache; performing a comparison between the expected number of allocated cache pages and an actual number of allocated or free cache pages in connection with the non-volatile storage device; and based on the comparison, selecting a free cache page in connection with the non-volatile storage device to allocate as a cache page.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
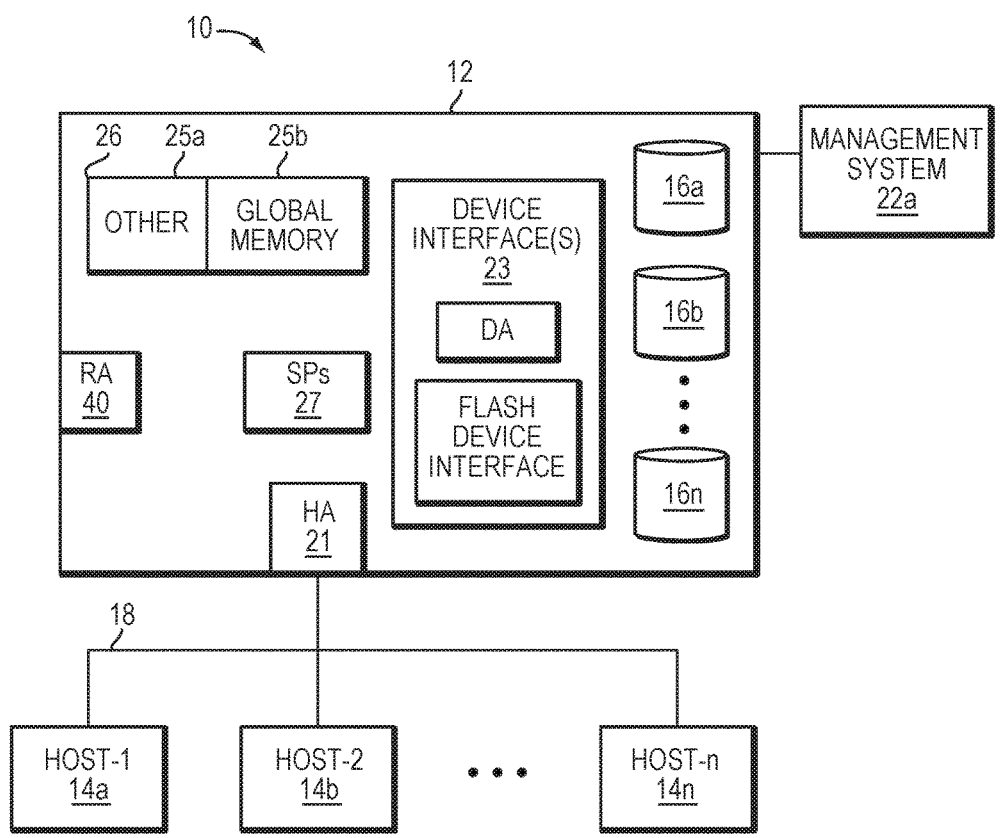
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical storage of the back end. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Figure 2:
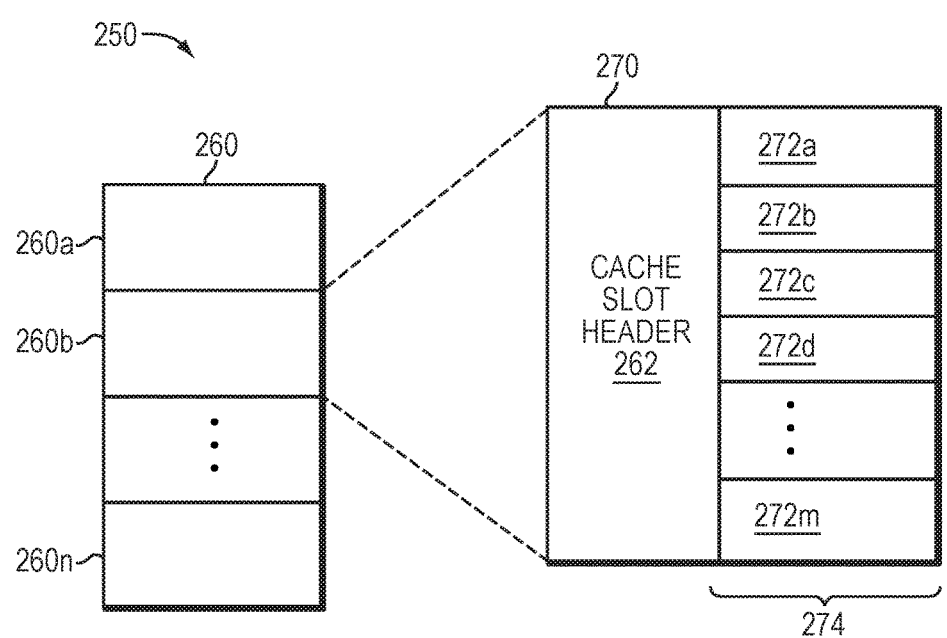
FIG. 2 is an example illustrating in more detail a representation of information that may be included in a primary data cache in an embodiment in accordance with techniques herein.

Referring to FIG. 2, shown is an example illustrating a logical representation of a cache that may be used in an embodiment in accordance with techniques herein. The cache in FIG. 2 may denote generally a data cache that may be used as part of a plurality of cache layers in an embodiment of a data storage system described in more detail below. The cache such as illustrated in FIG. 2 may be, for example, a DRAM cache that is primary or first caching layer in the plurality of caching layers described in more detail elsewhere herein.

In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage from cache.

Element 270 provides additional detail of single cache slot 260a. Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

Although not illustrated in FIG. 2 for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein.

Figure 3:
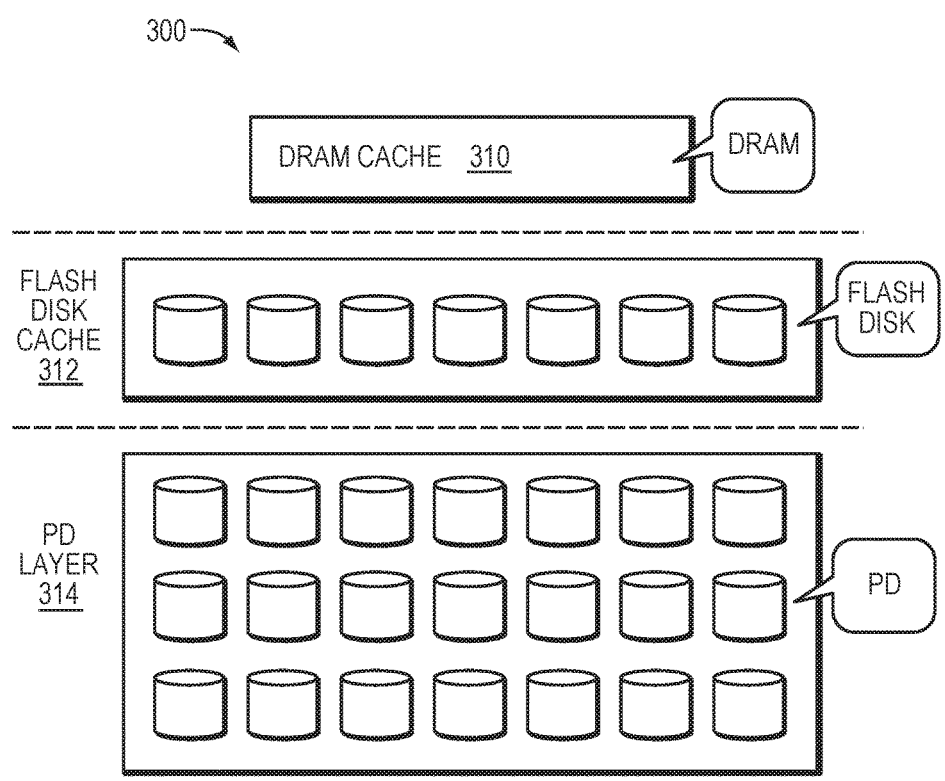
FIG. 3 is an example illustrating a plurality of layers that may be included in an I/O path in an embodiment in accordance with techniques herein.

Referring to FIG. 3, shown is an example illustrating a plurality of layers including caches and physical backend storage in an embodiment in accordance with techniques herein. The example 300 includes DRAM cache 310, flash disk cache 312, and a backend physical storage device (PD) layer 314. The flash disk cache 312 may include flash-based storage devices or other solid state storage. The PD layer 314 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 310 cache to service a read miss) and/or when writing data to the PDs (such as to destage data from DRAM cache 310).

In at least one embodiment of a data storage system in the illustrated hierarchy of FIG. 3, the Flash Disk Cache 312 is under the DRAM or general data cache 310, and below the Flash Disk Cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the Flash disk cache 312 may denote a level 2 (L2) secondary cache. Element 310 may denote, for example, the cache to which data is first written when write operations are received by the host such as described above. Generally, the layers of FIG. 3 may be ranked, in terms of relative performance, from highest to lowest, as follows: DRAM cache 310, the flash disk cache 312, and PDs 314. The Flash disk cache 312 may include flash-based storage devices. More generally, the flash disk cache 312 may include a form of solid state or other storage that may be non-volatile which fits in with the above-mentioned relative performance ranking.

Flash disk cache 312 may be characterized as a storage-system component that improves performance by transparently storing or promoting data from PDs 314 into Flash Disk media (Flash disk) of layer 312, so that user requests for data can be served much faster than if retrieved from PDs 314. PDs of layer 314 may be used to store all the user data and serve the I/O requests which cannot be serviced by using data from either DRAM cache 310 or Flash disk cache 312. Generally, as mentioned above, PDs of layer 314 provide the slowest response time of all layers 310, 312 and 314 when there is a need to access the PD to read data therefrom and/or write data thereto.

Data may be promoted from PDs 314 to the Flash cache 312 based on "temperature" related to I/O activity or frequency of access (e.g. number of reads and/or writes for the data). Placing or promoting data chunks from PDs 314 is not dependent on whether the data is already in DRAM cache 310. In at least one embodiment, the PDs 314 may denote rotating disk drives or more generally PDs having a lower performance than the flash-based drives of layer 312. In at least one embodiment, data may be stored in the Flash disk cache in chunks, such as chunks that are each 64 KB in size. It should be noted that in some systems, the backend physical storage devices may also include flash-based storage devices having an expected level of performance similar to those physical storage devices of the Flash disk cache 312. In such cases, an embodiment may decide not to use the Flash disk cache 312 with user data stored on back-end physical storage devices which are flash-based since there is similar performance when accessing data from either the back-end physical storage devices or Flash disk cache 312. Rather, an embodiment may selectively choose to enable or use the Flash disk cache 312 in connection with user data that will more generally see a performance benefit in obtaining data from the Flash disk cache rather than back-end storage devices. Thus, generally, the PDs of 314 may include rotational disk drives, or more generally, PDs having an excepted level of performance that is less than the expected level of performance when accessing data from drives or physical storage comprising the Flash disk cache 312.

In a manner similar to that as described in connection with FIG. 2, a memory map or mapping information may be maintained by the Flash disk cache layer 312 to indicate whether a particular data portion located at a particular LUN and offset (e.g., LBA) is currently stored in the Flash disk cache and if so, the particular location in the Flash disk cache where such data is located. In addition to the mapping information, the Flash disk cache 312 may also store information indicating whether the data stored in a cache page of the Flash disk cache 312 is dirty thereby denoting that the cache location includes valid data and contains the most recent copy of the data but has not yet been synchronized with the copy on of the PD layer 314. Generally, in addition to mapping information, the Flash disk cache layer 312 may use a structure referred to herein as the shadow cache to store other metadata that may be used by the Flash disk cache 312. For example, the shadow cache may store information regarding the access frequency of different data portions located at various LUN locations where such LUNs have storage provisioned from PDs of the PD layer 314. Thus, the frequency of access information in the shadow cache may be used to determine when to promote data from the PD layer 314 to the Flash disk cache 312.

It should also be noted that the Flash disk cache layer 312 may also experience cache or read hits and also cache or read misses with respect to whether requested read data is stored in the Flash disk cache 312. Thus, the Flash disk cache 312 may have associated states and experience cache hits and misses in a manner similar to the DRAM cache 310 used as the primary or level 1 cache in the hierarchy of FIG. 3.

Generally, the first time data is accessed for read or write, the data is stored in the DRAM cache 310 as the primary data cache in connection with I/O processing of the data path. Processing may be performed to monitor how frequently a particular data portion is accessed (such as within a specified period of time) to determine whether such observed access frequency reaches a threshold level to warrant storing such data also in the Flash disk cache layer 312. The shadow cache described above may be used by the Flash disk to track such access frequency for data at different LUN locations and determine when to promote a data portion stored at a particular LUN location from PDs 314 to the Flash disk cache 312.

In at least one embodiment the DRAM Cache 310 may cache the hottest (e.g., most frequently accessed) data and Flash Disk Cache 312 may cache data that is relatively less frequently accessed than data of the DRAM cache 310.

In connection with processing an I/O operation such as a read operation, processing may first determine whether the requested read data is in the primary data cache, such as the DRAM cache 310. If so, the requested data is read from cache and returned to the requester. If the requested read data is not in the primary data cache (e.g., DRAM cache 310), processing may determine whether the requested data is stored in the Flash disk cache. If so, the requested data is obtained from the Flash disk cache 312 and returned to the requester. If the requested data is not in the Flash disk cache 312, the requested data is obtained from PDs 314, may be stored in the DRAM cache 310 and then returned to the requester. Additionally, depending on frequency of access as described elsewhere herein, the data may also be stored in the Flash disk cache.

In connection with write operations, the write data is written to the primary data cache, such as the DRAM cache 310, and an acknowledgement is returned to the requester that the write operation has complete. At some later point in time, processing may be performed to destage the write data from the DRAM cache 310. As mentioned elsewhere herein, data, such as the write data being destaged, may be promoted to the Flash disk cache if there has been sufficient frequency of access to such write data. Thus, as part of destaging the write data from the DRAM cache 310, processing may include determining whether the write data has been promoted to the Flash disk cache. If so, the write data is stored in the Flash disk cache and then later may be flushed from the Flash disk cache to the PDs 314. If the write data is not promoted to the Flash disk cache, the data is written out from the DRAM cache directly to the PDs 314.

In some embodiments, it may be that write caching to the primary data cache, such as DRAM cache 310, is disabled whereby caching may be performed with respect to only the Flash disk cache layer 312. In such a case, the write data received is not stored in the DRAM cache 310 when received and rather the write operation data processing proceeds directly to the Flash cache layer where a determination is made as to whether to store the data in the Flash disk cache. As noted elsewhere herein, such a determination may be made based on whether there has been a sufficient level of access frequency (e.g., above a specified threshold level of activity) to the write data to warrant storing or promoting the write data to the Flash disk cache. If it is determined that the write data has not been promoted to the Flash disk cache, the write data is written directly to the PDs 314. Otherwise, if it determined that the write data has been promoted to the Flash disk cache, the write data is written to the Flash disk cache and then some time later may be flushed to the PDs 314.

In an embodiment in accordance with techniques herein, the I/O path denoting the processing path taken in connection with processing a user or host I/O operation may pass through the layers such as illustrated in FIG. 3.

Figure 4:
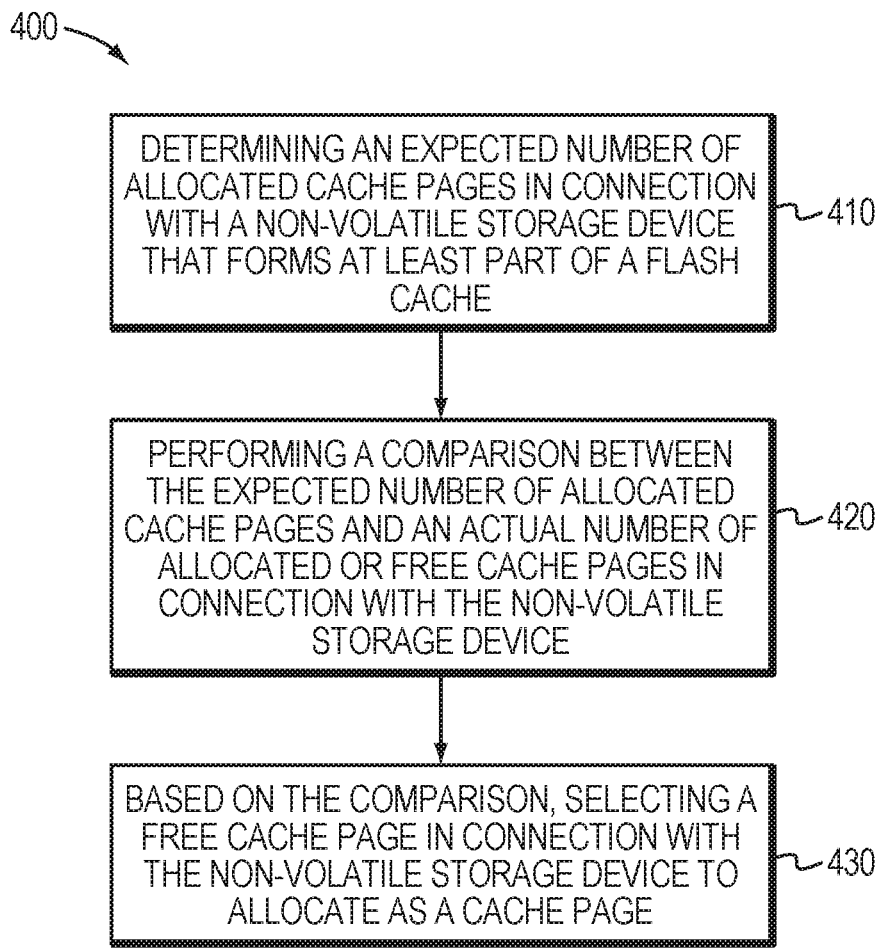
FIG. 4 is a flowchart of processing steps that may be performed in an embodiment in accordance with techniques herein.

Referring to FIG. 4, there is illustrated a flowchart 400 of processing steps that may be performed in an embodiment in accordance with techniques herein. In the flowchart 400, the steps are summarized in individual blocks. The steps may be performed in hardware, or as processor-executable instructions that may be executed by a processor. Furthermore, the steps may, but need not necessarily, be implemented in the system of FIG. 1.

At step 410, a determination is made of an expected number of allocated cache pages in connection with a non-volatile storage device that forms at least part of a flash cache. At step 420, a comparison is performed between the expected number of allocated cache pages and an actual number of allocated or free cache pages in connection with the non-volatile storage device. At step 430, a free cache page is selected, based on the comparison, in connection with the non-volatile storage device to allocate as a cache page.

In this particular embodiment, the non-volatile storage device (e.g., SSD) is one of a plurality of non-volatile storage devices that forms the flash cache. It should be appreciated that the flash cache may be similar to that described above in connection with FIG. 3. Along these lines, the flash cache may also form one of multiple storage layers ranked, in terms of relative performance, from highest to lowest, with a volatile memory layer (e.g., DRAM cache 310) ranked as the highest and a physical device layer (e.g., PDs 314) as the lowest layer. The flash cache layer may be ranked between these two layers such that data may be promoted from a lower layer or demoted from a higher layer as described above in detail.

Further, it should be understood that in this particular embodiment the step 410 may comprise multiple parts. To this end, one of the parts may comprise forming a first value relating to available cache storage associated with the non-volatile storage device. Another part may comprise forming a second value relating to available cache storage associated with the flash cache. Another part may comprise forming a ratio of the first value to the second value to produce a third value. Another part may comprise forming a fourth value relating to an actual number of allocated cache pages in connection with the flash cache. Still another part may comprise forming a product of the third and fourth values to produce the expected number of allocated cache pages in connection with the non-volatile storage device.

For example, in one particular embodiment, the expected number of allocated cache pages in connection with the non-volatile storage device may be calculated using the following formula:

$$P_i = \frac{(1-O_i)*C_i}{\sum_{n=1}^{i}(1-O_i)*C_i} * \text{Total\_Pages}$$

$O_i$—percentage of capacity reserved in connection with storage device i $C_i$—total user capacity in connection with storage device i Total_Pages—total pages allocated in connection with flash cache $P_i$—expected number of allocated cache pages in connection with storage device i As discussed above, the formula is used to calculate the expected number of allocated cache pages per device. Oi represents the percentage of capacity which is reserved. For example, for medium endurance flash, not all the drive capacity is used to store data and often some capacity is reserved in order to prolong the flash drive life cycle. Ci represents the drive capacity. Total_Pages is the number of cache pages allocated in connection with flash cache.

It should be understood that the processing steps described above may be performed in several embodiments that require balancing of allocated cache pages among storage devices (e.g., SSDs) that form the flash cache. In one particular embodiment, the steps may be performed when a further SSD is added to the flash cache. In such an embodiment, the number of allocated cache pages in connection with the newly added SSD will differ from existing SSDs that form the flash cache. Such a deviation may lead to an unbalanced situation in which the older SSDs receive more I/Os than the newly added SSD causing the life cycle of the older SSDs to be impacted over a period of time. As a result, the processing steps may be performed in connection with rebalancing allocated cache pages among storage devices in the flash cache. This will be described in further detail below with respect to FIGS. 5A and 5B.

Figure 5A:
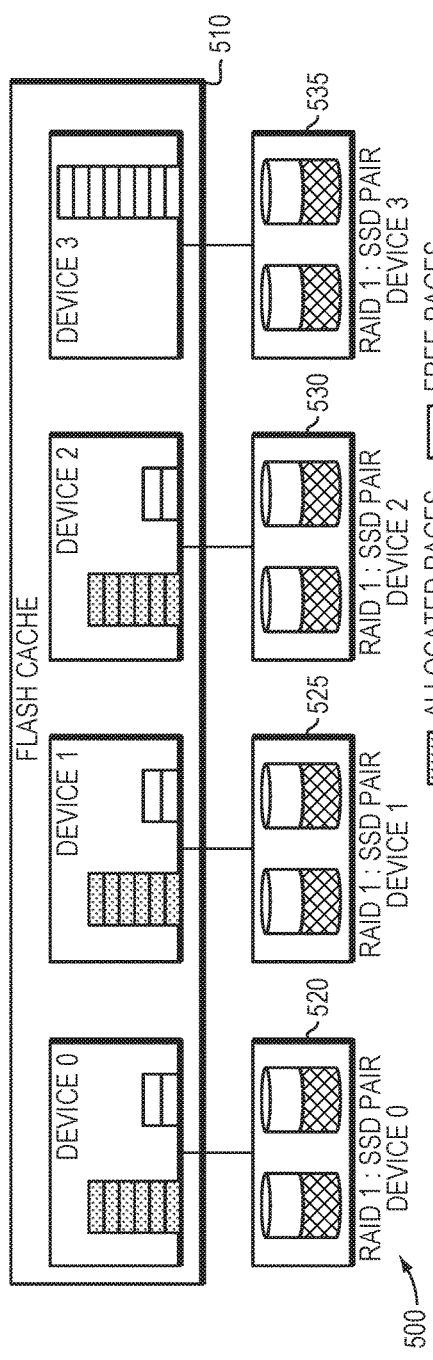
FIGS. 5A, 5B, 6A and 6B are examples of exemplary implementations of balancing allocated cache pages among storage devices in a flash cache in an embodiment in accordance with techniques herein.

Referring to FIG. 5A, there is illustrated a system 500 comprising a flash cache 510 and four non-volatile storage devices (0, 1, 2, 3) each consisting of a pair of SSDs (520, 525, 530, 535). Each pair of SSDs is configured in a RAID0 configuration such that the flash cache treats the pairs as storage devices for storing data. In this particular arrangement, the storage devices (0, 1, 2) are the initial storage devices that created the flash cache. Device 3 is newly added to the flash cache. Further, each of the storage devices (0, 1, 2) has 6 allocated cache pages. No cache pages have been allocated in connection with device 3.

In this particular embodiment, a write I/O is received that relates to an allocated cache page in connection with storage device 0 (i.e., cache hit). As a result, a comparison is made between the expected number of allocated cache pages in connection with device 0 and the actual number of allocated cache pages in connection with device 0. For example, according to the formula described above, the expected number of allocated cache pages in connection with device 0 is 4 pages (i.e., (6×3)/4=circa 4 pages). The actual number of allocated cache pages in connection with device 0 is 6 pages. As a result, since the actual number is greater than the expected number in connection with storage device 0, it is necessary to compare the actual and expected numbers in connection with other storage devices in order to identify a storage device in which the actual number is less than the expected number. The only storage device, in this particular example, that satisfies such a condition is the newly added storage device 3. Note, devices (1, 2, 3) all have expected values of 4 pages. A free page is then selected from device 3 to allocate as a cache page. The data associated with the write I/O is written to the selected cache page. A command is also issued to device 0 to free the allocated cache page (e.g., TRIM command) The corresponding metadata in connection with the cache pages is finally updated.

Figure 5B:
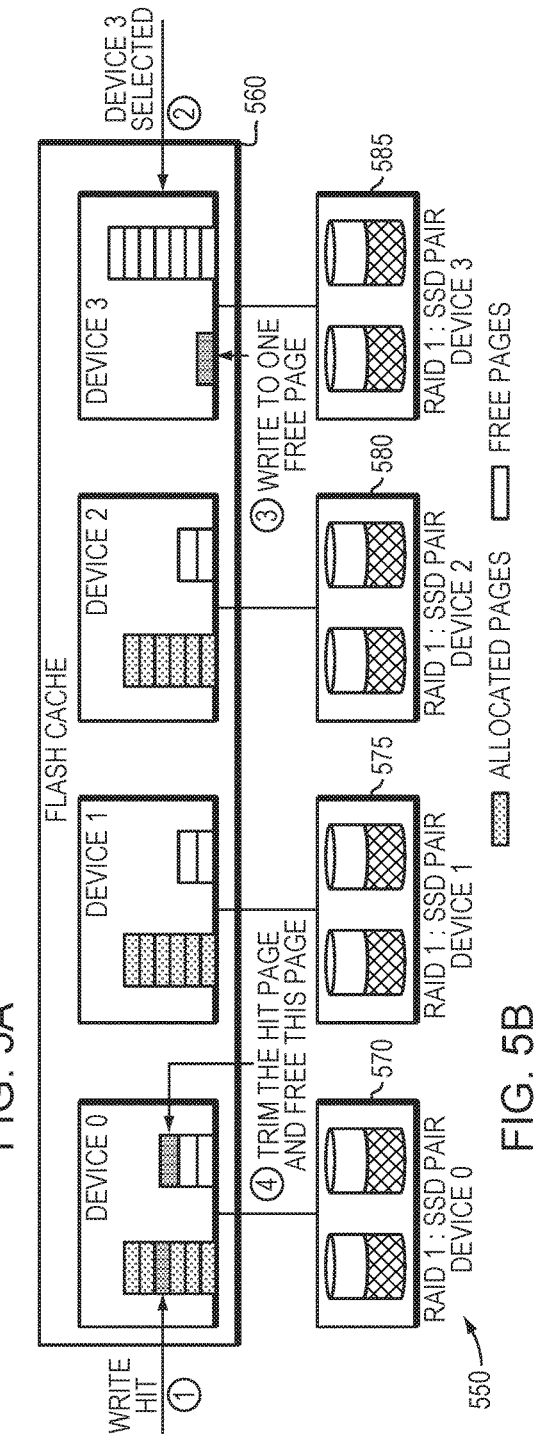

Referring to FIG. 5B, there is illustrated an example embodiment showing steps as described above in connection with FIG. 5A for balancing allocated cache pages between devices 0 and 3. The figure illustrates a system 550 comprising a flash cache 560 and four non-volatile storage devices (0, 1, 2, 3) each formed by pairs of solid state devices (570, 575, 580, 585). It should be understood that although the numerals are different the features correspond to their counterparts in FIG. 5A. As illustrated, a write I/O is received in connection with an allocated cache page associated with device 0. This is illustrated by step 1 in the figure. The next step 2 involves selecting device 3 and a free cache page in connection with device 3. The next step 3 involves writing data associated with the write I/O to the selected cache page. The final step 4 involves issuing a command (e.g., TRIM command) that frees the allocated cache page in connection with device 0.

It should also be understood that the processing steps described above may be performed in other embodiments such as when a storage device is removed from the flash cache. In such an embodiment, the allocated cache pages on the storage device to be removed can be relocated or moved to another storage device in the flash cache. To this end, if other storage devices in the flash cache possess enough free cache pages, the allocated cache pages on the storage device to be removed can be relocated to these other storage devices. Otherwise, the cache pages may be flushed to physical disks (e.g., HDD). It should be understood that the free cache pages may be selected and allocated as described above. For example, the expected number of allocated cache pages is determined per device. If the expected number of allocated cache pages is greater than the actual number of allocated cache pages then a free cache page in connection with the storage device is selected for allocation. Data associated with the cache page in the storage device to be removed can then be relocated to the selected cache page.

Figure 6A:
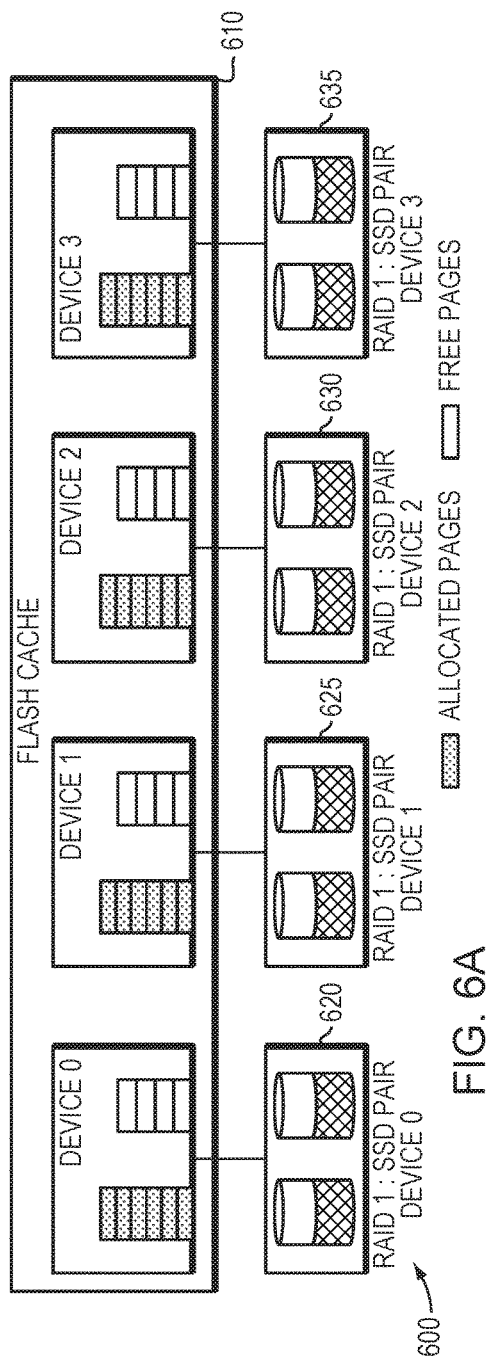

Referring to FIG. 6A, there is illustrated a system 600 comprising a flash cache 610 and four non-volatile storage devices (0, 1, 2, 3) each formed by pairs of solid state devices (620, 625, 630, 635). As illustrated, 6 pages are allocated per device. In this particular embodiment, device 3 is to be removed from flash cache. Also, it can be seen that the other devices have enough free pages to store data associated with the allocated cache pages in connection with device 3. In this particular embodiment, the expected number of allocated cache pages is calculated in connection with storage devices (0, 1, 2). The actual number of allocated cache pages is less than the expected number for each device. As a result, a free cache page is selected in connection with each device. Data from allocated cache pages in device 3 is moved to the other devices 0, 1 and 2.

Figure 6B:
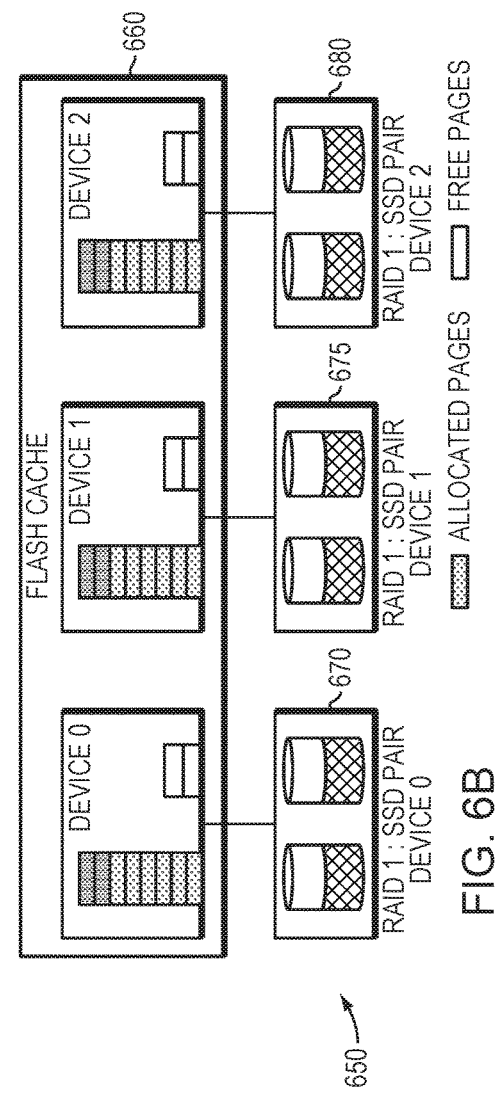

Referring to FIG. 6B, there is illustrated an example embodiment in accordance with an embodiment showing the system after device 3 is removed as described above. It should be understood that although the numerals are different the features correspond to their counterparts in FIG. 6A.

The figure illustrates system 650 comprising a flash cache 660 and three non-volatile storage devices (0, 1, 2) each formed by pairs of solid state devices (670, 675, 680). The figure illustrates the allocated cache pages balanced across the storage devices after the device 3 is removed.

It should also be understood that the steps may be used in other embodiments in which data is promoted into the flash cache. For example, suppose that the system uses a round-robin algorithm to allocate cache pages among the existing storage devices forming the flash cache. In one particular arrangement, an index is used to record the next storage device from which a free cache page should be allocated. If the actual number of allocated cache pages in connection with this storage device is less than the expected number of allocated cache pages, a free cache page should be allocated from this storage device and the data should be promoted to this allocated free cache page. Otherwise, the index moves to the next storage device and repeats the above process of checking the expected and actual numbers of allocated cache pages in connection with the storage devices. The procedure continues until a storage device is found in which the actual number is less than the expected number.

While the above embodiments describe the step of comparing the expected and actual number of allocated cache pages, it should be understood that in other embodiments the comparison may be between the expected number of allocated cache pages and the actual number of free pages in connection with a storage device. For example, if the number of free pages is greater than the expected number of allocated cache pages in connection with a storage device then a free cache page may be selected from the storage device for allocation.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
   determining an expected number of allocated cache pages in connection with a non-volatile storage device that forms at least part of a flash cache;
   performing a comparison between the expected number of allocated cache pages and an actual number of allocated or free cache pages in connection with the non-volatile storage device; and
   based on the comparison, selecting a free cache page in connection with the non-volatile storage device to allocate as a cache page, to balance the allocated or free cache pages among a plurality of non-volatile storage devices that form the flash cache, wherein the non-volatile storage device is one of the plurality of non-volatile storage devices that forms the flash cache; and
   wherein determining the expected number of allocated cache pages in connection with the non-volatile storage device comprises: forming a first value relating to available cache storage associated with the non-volatile storage device; forming a second value relating to available cache storage associated with the flash cache;

forming a ratio of the first value to the second value to produce a third value; forming a fourth value relating to an actual number of allocated cache pages in connection with the flash cache; and forming a product of the third and fourth values to produce the expected number of allocated cache pages in connection with the non-volatile storage device.

2. The method as claimed in claim 1, wherein the non-volatile storage device is one of the plurality of non-volatile storage devices that forms the flash cache; and
wherein the method further comprises:
receiving a write I/O relating to a cache page in connection with another non-volatile storage device of the plurality of non-volatile storage devices that forms the flash cache;
performing a second comparison between the expected number of allocated cache pages and an actual number of allocated or free cache pages in connection with the another non-volatile storage device;
based on the second comparison, writing data associated with the write I/O to the selected cache page in connection with the non-volatile storage device; and
sending a command to free the cache page in connection with the another non-volatile storage device.

3. The method as claimed in claim 1, wherein the non-volatile storage device is one of the plurality of non-volatile storage devices that forms the flash cache; and
wherein the method further comprises:
receiving data that is one of promoted or demoted to the flash cache; and
storing the data in the selected cache page in connection with the non-volatile storage device of the plurality of non-volatile storage devices that forms the flash cache.

4. The method as claimed in claim 1, wherein the non-volatile storage device is one of the plurality of non-volatile storage devices that forms the flash cache; and
wherein the method further comprises:
detecting an intention to remove one of the plurality of non-volatile storage devices from the flash cache; and
moving data associated with a cache page in connection with the one of the plurality of non-volatile storage devices to the selected cache page.

5. The method as claimed in claim 1, wherein the actual number corresponds to the amount of allocated cache pages in connection with the non-volatile storage device; and
wherein performing the comparison, comprises:
determining if the expected number of allocated cache pages is greater or less than the actual number of allocated cache pages in connection with the non-volatile storage device; and
in response to determining the expected number is greater than the actual number, determining to select a free cache page in connection with the non-volatile storage device to allocate as a cache page.

6. The method as claimed in claim 1, wherein the actual number corresponds to the amount of free cache pages in connection with the non-volatile storage device; and
wherein performing the comparison, comprises:
determining if the expected number of allocated cache pages is greater or less than the actual number of free cache pages in connection with the non-volatile storage device; and
in response to determining the expected number is less than the actual number, determining to select a free cache page in connection with the non-volatile storage device to allocate as a cache page.

7. An apparatus, comprising:
memory; and
processing circuitry coupled to the memory, the memory storing program code which, when executed by the processing circuitry, cause the processing circuitry to:
determine an expected number of allocated cache pages in connection with a non-volatile storage device that forms at least part of a flash cache;
perform a comparison between the expected number of allocated cache pages and an actual number of allocated or free cache pages in connection with the non-volatile storage device; and
based on the comparison, select a free cache page in connection with the non-volatile storage device to allocate as a cache page, to balance the allocated or free cache pages among a plurality of non-volatile storage devices that form the flash cache, wherein the non-volatile storage device is one of the plurality of non-volatile storage devices that forms the flash cache; and
wherein determining the expected number of allocated cache pages in connection with the non-volatile storage device comprises: forming a first value relating to available cache storage associated with the non-volatile storage device; forming a second value relating to available cache storage associated with the flash cache; forming a ratio of the first value to the second value to produce a third value; forming a fourth value relating to an actual number of allocated cache pages in connection with the flash cache; and forming a product of the third and fourth values to produce the expected number of allocated cache pages in connection with the non-volatile storage device.

8. The apparatus as claimed in claim 7, wherein the non-volatile storage device is one of the plurality of non-volatile storage devices that forms the flash cache; and
wherein the memory stores program code which, when executed by the processing circuitry, cause the processing circuitry to:
receive a write I/O relating to a cache page in connection with another non-volatile storage device of the plurality of non-volatile storage devices that forms the flash cache;
perform a second comparison between the expected number of allocated cache pages and an actual number of allocated or free cache pages in connection with the another non-volatile storage device;
based on the second comparison, write data associated with the write I/O to the selected cache page in connection with the non-volatile storage device; and
send a command to free the cache page in connection with the another non-volatile storage device.

9. The apparatus as claimed in claim 7, wherein the non-volatile storage device is one of the plurality of non-volatile storage devices that forms the flash cache; and
wherein the memory stores program code which, when executed by the processing circuitry, cause the processing circuitry to:
receive data that is one of promoted or demoted to the flash cache; and
store the data in the selected cache page in connection with the non-volatile storage device of the plurality of non-volatile storage devices that forms the flash cache.

10. The apparatus as claimed in claim 7, wherein the non-volatile storage device is one of the plurality of non-volatile storage devices that forms the flash cache; and wherein the memory stores program code which, when executed by the processing circuitry, cause the processing circuitry to:
detect an intention to remove one of the plurality of non-volatile storage devices from the flash cache; and
move data associated with a cache page in connection with the one of the plurality of non-volatile storage devices to the selected cache page.

11. The apparatus as claimed in claim 7, wherein the actual number corresponds to the amount of allocated cache pages in connection with the non-volatile storage device; and wherein performing the comparison, comprises:
determining if the expected number of allocated cache pages is greater or less than the actual number of allocated cache pages in connection with the non-volatile storage device; and
in response to determining the expected number is greater than the actual number, determining to select a free cache page in connection with the non-volatile storage device to allocate as a cache page.

12. The apparatus as claimed in claim 7, wherein the actual number corresponds to the amount of free cache pages in connection with the non-volatile storage device; and wherein performing the comparison, comprises:
determining if the expected number of allocated cache pages is greater or less than the actual number of free cache pages in connection with the non-volatile storage device; and
in response to determining the expected number is less than the actual number, determining to select a free cache page in connection with the non-volatile storage device to allocate as a cache page.

13. A computer program product having a non-transitory computer readable medium which stores a set of instructions, the set of instructions, when carried out by processing circuitry, causing the processing circuitry to perform a method, the method comprising:
determining an expected number of allocated cache pages in connection with a non-volatile storage device that forms at least part of a flash cache;
performing a comparison between the expected number of allocated cache pages and an actual number of allocated or free cache pages in connection with the non-volatile storage device; and
based on the comparison, selecting a free cache page in connection with the non-volatile storage device to allocate as a cache page, to balance the allocated or free cache pages among a plurality of non-volatile storage devices that form the flash cache, wherein the non-volatile storage device is one of the plurality of non-volatile storage devices that forms the flash cache; and
wherein determining the expected number of allocated cache pages in connection with the non-volatile storage device comprises: forming a first value relating to available cache storage associated with the non-volatile storage device; forming a second value relating to available cache storage associated with the flash cache; forming a ratio of the first value to the second value to produce a third value; forming a fourth value relating to an actual number of allocated cache pages in connection with the flash cache; and forming a product of the third and fourth values to produce the expected number of allocated cache pages in connection with the non-volatile storage device.

14. The computer program product as claimed in claim 13, wherein the non-volatile storage device is one of the plurality of non-volatile storage devices that forms the flash cache; and wherein the method further comprises:
receiving a write I/O relating to a cache page in connection with another non-volatile storage device of the plurality of non-volatile storage devices that forms the flash cache;
performing a second comparison between the expected number of allocated cache pages and an actual number of allocated or free cache pages in connection with the another non-volatile storage device;
based on the second comparison, writing data associated with the write I/O to the selected cache page in connection with the non-volatile storage device; and
sending a command to free the cache page in connection with the another non-volatile storage device.

15. The computer program product as claimed in claim 13, wherein the non-volatile storage device is one of the plurality of non-volatile storage devices that forms the flash cache; and wherein the method further comprises:
receiving data that is one of promoted or demoted to the flash cache; and
storing the data in the selected cache page in connection with the non-volatile storage device of the plurality of non-volatile storage devices that forms the flash cache.

16. The computer program product as claimed in claim 13, wherein the non-volatile storage device is one of the plurality of non-volatile storage devices that forms the flash cache; and wherein the method further comprises:
detecting an intention to remove one of the plurality of non-volatile storage devices from the flash cache; and
moving data associated with a cache page in connection with the one of the plurality of non-volatile storage devices to the selected cache page.

17. The computer program product as claimed in claim 13, wherein the actual number corresponds to the amount of allocated cache pages in connection with the non-volatile storage device; and wherein performing the comparison, comprises:
determining if the expected number of allocated cache pages is greater or less than the actual number of allocated cache pages in connection with the non-volatile storage device; and
in response to determining the expected number is greater than the actual number, determining to select a free cache page in connection with the non-volatile storage device to allocate as a cache page.

* * * * *